UNITED STATES PATENT OFFICE.

GEORGE G. ANDRÉ, OF GLENLEAN SANDBANK BY GREENOCK, SCOTLAND, ASSIGNOR TO CHARLES HERBERT CURTIS, OF LONDON, ENGLAND.

MANUFACTURE OF GUNPOWDER.

SPECIFICATION forming part of Letters Patent No. 575,765, dated January 26, 1897.

Application filed October 31, 1892. Serial No. 450,552. (Specimens.) Patented in England November 4, 1891, No. 19,068; in Norway September 27, 1892, No. 3,201, and in Canada January 11, 1893, No. 41,524.

*To all whom it may concern:*

Be it known that I, GEORGE GUILLAUME ANDRÉ, civil engineer and gunpowder manufacturer, a subject of the Queen of Great Britain, residing at Glenlean Sandbank by Greenock, in the county of Argyle, Scotland, have invented certain new and useful Improvements in the Manufacture of Gunpowder, (for which Letters Patent have been obtained in the following countries, to wit: Great Britain, No. 19,068, dated November 4, 1891; Canada, No. 41,524, dated January 11, 1893, and Norway, No. 3,201, dated September 27, 1892;) and I do hereby declare that the following is a full, clear, and exact description of the invention, which will enable others skilled in the art to which it appertains to make and use the same.

It has been a matter of common knowledge among chemists ever since the discovery of guncotton in 1845 that nitrocellulose is soluble in certain ethers. This solubility affords the readiest and the most frequently used test of the degree of nitration effected in the cellulose. Thus cotton, for example, nitrated in the second degree and known as "dinitrocellulose" is soluble in ordinary (sulfuric) ether to which a small proportion of alcohol has been added, while cotton nitrated in the third degree and known as "trinitrocellulose" is not soluble in that substance; but this same trinitrocellulose, as well as the lower grade, (dinitrocellulose,) is soluble in acetic ether and in acetone. Several inventors have of late utilized the solvent property of acetic ether and acetone to completely dissolve nitrocellulose for the purpose of rendering the latter fit for use as gunpowder. Their method is to reduce the mass of nitrocellulose and solvent to a thick homogeneous paste by macerating and kneading it, so as to completely destroy the fibrous nature of the cellulose, and then to produce from this paste rods, wires, strips, or granules by means of special machinery and apparatus. According to this invention none of these things are claimed, but the method of manufacturing gunpowder is proceeded with as follows: A small proportion, say from six to sixteen per cent., of dinitrocellulose is first mixed with the guncotton, (trinitrocellulose.) By mixing from six to sixteen per cent. of dinitrocellulose with the guncotton is meant adding that proportion to the ordinary high-grade guncotton, which usually contains about twelve per cent. of the soluble grade. Thus the total proportion will be from eighteen to twenty-eight parts of dinitrocellulose to eighty-eight parts of the trinitrocellulose. These are the extreme limits. Or a guncotton is produced containing the requisite proportion of cotton nitrated in the second degree and then this nitrocotton is manufactured while in the wet and therefore inexplosive state into granules or pellets in any suitable manner, as by passing the wet material through a sieve and then rolling or tumbling the same in a barrel. So made, these granules or pellets are soft and easily friable, and when dried they become violently explosive. In this state they are useless as gunpowder. These dried (or it may be partially dried) granules are next treated with the solvent capable of dissolving only the dinitrocellulose, the quantity of solvent used being about one gallon to five pounds of the granulated material. The dinitrocellulose when partly dissolved forms a cement strong and inflammable but only feebly explosive. This cement hardens on the evaporation of the solvent and binds firmly together the undissolved fibers of guncotton. There is, it will be observed, no mere coating of the granules in this case and no mere hardening of the surface only, but all the fibers throughout the mass of the granule are strongly cemented together, so that the said granule becomes very hard and so strong that it cannot be broken up by rubbing between the fingers. This effect is very different from that which is brought about by the use of collodion to harden the granules. In the latter case the granules are friable and may be easily rubbed to powder by the fingers.

Another and a very important effect of cementing together the fibers of guncotton of which the granule is composed in the way described is to moderate their explosiveness. By simply varying the proportion of the dinitrocellulose within the limits already mentioned any requisite degree of explosiveness may be obtained. The larger the proportion of partly-dissolved cotton present the slower will be the rate of burning. This graduation of the rate of combustion cannot be obtained when the whole of the explosive material is dissolved by acetic ether or acetone.

The invention is not limited to the method of first producing the granules or pellets and then treating them with the solvent. The prepared nitrocellulose may be treated with the solvent, and afterward, but before the solvent has evaporated, it is made into pellets.

To retard ignition, the whole surface of the granules or pellets manufactured in the way described may be dissolved by sprinkling these granules or pellets with acetic ether or acetone.

Nitroglycerin may be combined with the nitrocellulose by dissolving the former in the solvent used for the latter.

A suitable proportion of ingredients is forty-four parts, by weight, of trinitrocellulose and twelve parts, by weight, of dinitrocellulose, with or without forty parts, by weight, of nitroglycerin.

Having fully described my invention, what I desire to claim and secure by Letters Patent is—

1. In the manufacture of explosives the improvement which consists in granulating or reducing to pellets a compound of trinitro and dinitro cellulose, subjecting the granules or pellets to the action of a solvent capable of dissolving the dinitrocellulose without affecting the trinitrocellulose, whereby the particles of trinitrocellulose become coated with and are cemented together by the dissolved dinitrocellulose, then hardening the granules or pellets by removal of the solvent, substantially as set forth.

2. In the manufacture of explosives, the improvement which consists in intimately mixing or combining trinitro and dinitro cellulose in about the proportions set forth, granulating or reducing the mixture to pellets, subjecting the granules or pellets to the action of a vaporizable solvent capable of dissolving the dinitrocellulose without affecting the trinitrocellulose, whereby the particles of the latter become coated with and are cemented together by the dissolved dinitrocellulose, and hardening the said granules or pellets by removal of the solvent, substantially as set forth.

3. In the manufacture of explosives, the improvement which consists in intimately mixing trinitro and dinitro cellulose in about the proportions set forth, dividing the compound while wet into pellets or granules, drying the same, cementing together the particles of trinitrocellulose in the pellets or granules by dissolving or gelatinizing the dinitro constituent thereof by means of a solvent holding nitroglycerin in solution, which solvent will not affect the trinitro constituent, and hardening the pellets or granules by removal of the solvent after dissolution or gelatinization of the dinitrocellulose, for the purpose set forth.

4. In the manufacture of explosives, the improvement which consists in granulating or reducing to pellets, in a wet state, a compound of dinitro and trinitro cellulose, subjecting the granules or pellets to the action of a solvent capable of dissolving the dinitrocellulose only, whereby the particles of trinitro cellulose become coated with and are cemented together by the dissolved dinitrocellulose, and then hardening the granules or pellets by removal of the solvent, substantially as set forth.

GEO. G. ANDRÉ.

Witnesses:
LOUIS BLAIR,
J. B. M. ANDREW.